US010712162B2

(12) United States Patent
Malewicz

(10) Patent No.: US 10,712,162 B2
(45) Date of Patent: Jul. 14, 2020

(54) METHOD AND A COMPUTER SYSTEM FOR PROVIDING A ROUTE OR A ROUTE DURATION FOR A JOURNEY FROM A SOURCE LOCATION TO A TARGET LOCATION

(71) Applicant: Grzegorz Malewicz, Kielce (PL)

(72) Inventor: Grzegorz Malewicz, Kielce (PL)

( * ) Notice: Subject to any disclaimer, the term of this patent is extended or adjusted under 35 U.S.C. 154(b) by 0 days.

(21) Appl. No.: 16/180,050

(22) Filed: Nov. 5, 2018

(65) Prior Publication Data

US 2019/0195639 A1    Jun. 27, 2019

Related U.S. Application Data

(60) Provisional application No. 62/613,779, filed on Jan. 5, 2018, provisional application No. 62/659,157, filed on Apr. 18, 2018, provisional application No. 62/608,586, filed on Dec. 21, 2017.

(30) Foreign Application Priority Data

Apr. 19, 2018    (KR) .................... 10-2018-0045558

(51) Int. Cl.
*G01C 21/34*    (2006.01)
*G01C 21/20*    (2006.01)
*G01C 21/36*    (2006.01)

(52) U.S. Cl.
CPC ........... *G01C 21/343* (2013.01); *G01C 21/20* (2013.01); *G01C 21/3423* (2013.01); *G01C 21/3453* (2013.01); *G01C 21/3492* (2013.01); *G01C 21/3673* (2013.01)

(58) Field of Classification Search
None
See application file for complete search history.

(56) References Cited

U.S. PATENT DOCUMENTS

| 7,957,871 B1* | 6/2011 | Echeruo ............ G01C 21/3626 104/27 |
| 9,194,705 B2* | 11/2015 | Nonner .............. G01C 21/3423 |
| 9,404,760 B2* | 8/2016 | Ulloa Paredes ....... G06Q 10/04 |
| 10,521,473 B2* | 12/2019 | Jin ...................... G06F 16/9024 |
| 2011/0112759 A1* | 5/2011 | Bast ..................... G01C 21/343 701/533 |

(Continued)

*Primary Examiner* — Christian Chace
*Assistant Examiner* — Amelia J. I. Vorce
(74) *Attorney, Agent, or Firm* — Grzegorz Malewicz

(57) ABSTRACT

Embodiments relate to producing a plan of a route in a transportation system. The method receives route requirements, including a starting location and an ending location. The method builds a model of the transportation system from data about vehicles. The model abstracts a "prospect travel" between two locations using any of a range of choices of vehicles and walks that can transport between the two locations. Given anticipated wait durations for the vehicles and their ride durations, the method determines an expected minimum travel duration using any of these choices. The method combines the expectations for various locations in a scalable manner. As a result, a route plan that achieves a shortest expected travel duration, and meets other requirements, is computed for one of the largest metropolitan areas in existence today. Other embodiments include a computer system and a product service that implement the method.

4 Claims, 14 Drawing Sheets

(56) References Cited

U.S. PATENT DOCUMENTS

| | | | |
|---|---|---|---|
| 2011/0158232 A1* | 6/2011 | Nesbitt | H04L 45/00 370/389 |
| 2013/0238242 A1* | 9/2013 | Yoshizumi | G01C 21/3492 701/533 |
| 2013/0304378 A1* | 11/2013 | Graells | G01C 21/3423 701/533 |
| 2014/0188788 A1* | 7/2014 | Bridgen | G06F 16/29 707/609 |
| 2014/0257697 A1* | 9/2014 | Gishen | G01C 21/3438 701/537 |
| 2015/0142168 A1* | 5/2015 | Holland | G06Q 10/04 700/228 |
| 2017/0132544 A1* | 5/2017 | Michel | G06Q 50/30 |
| 2017/0357914 A1* | 12/2017 | Tulabandhula | G06Q 10/02 |
| 2018/0283886 A1* | 10/2018 | Mas-Ud Hussain | G01C 21/3446 |
| 2018/0322441 A1* | 11/2018 | Zaourar-Michel | G06Q 10/063116 |
| 2019/0020578 A1* | 1/2019 | Beckmann | H04L 45/02 |
| 2019/0056233 A1* | 2/2019 | Liu | G01C 21/3423 |
| 2019/0156662 A1* | 5/2019 | Zhong | G08G 1/0141 |

* cited by examiner

FIG. 9

```
let C and C' be two clusterings of bus stops and subway stations for each cluster c' in C'
   add vertex PROSPECT_CLUSTER_TARGET_c'
   add edges
      PROSPECT_CLUSTER_TARGET_c'→BUS_STOP_b
      PROSPECT_CLUSTER_TARGET_c'→SUBWAY_STATION_s
      with zero weight, for every bus stop b and subway station s in cluster c' for each cluster c in C
   add vertex PROSPECT_CLUSTER_SOURCE_c
   add edges
      BUS_STOP_b→PROSPECT_CLUSTER_SOURCE_c
      SUBWAY_STATION_s→PROSPECT_CLUSTER_SOURCE_c
      with zero weight, for every bus stop b and subway station s in cluster c for each cluster c in C
   independentMap = empty map
   for each walk wHead from c to a nearby bus stop BUS_STOP_b
      perform a depth-first traversal of the graph starting at BUS_STOP_b
         to enumerate paths with edges WaitGetOn,RideSame,...,RideSame,GetOff
      for each path
         let e be the bus line, and BUS_STOP_b' be the vertex at the end of the path
         let rideDuration = sum of weights of the RideSame along the path
         let maxWaitDuration = 2 * weight of the WaitGetOn on the path
         for each shortest walk wTail from BUS_STOP_b' to a cluster c'
            let moveDuration = duration of wHead + duration of wTail + rideDuration
            if not mapped at [c',e], or the mapped > moveDuration + maxWaitDuration / 2
               independentMap[c',e] = (maxWaitDuration, moveDuration)

dependentMap = empty map
   for each walk wHead from c to a nearby subway station SUBWAY_STATION_s
      perform a depth-first traversal of the graph starting at SUBWAY_STATION_s
         to enumerate paths with edges WaitGetOn,RideManyGetOff
      for each path
         let SUBWAY_STATION_s' be the vertex at the end of the path
         let rideDuration = weight of the RideManyGetOff on the path
         let maxWaitDuration = 2 * weight of the WaitGetOn on the path
         for each shortest walk wTail from SUBWAY_STATION_s' to a cluster c'
            let moveDuration = duration of wHead + duration of wTail + rideDuration
            append (maxWaitDuration, moveDuration) to dependentMap[c']

for each cluster c' in C'
      let there be exactly k bus lines e_1,...,e_k mapped by independentMap with value
         independentMap[c',e_i] = (maxWaitDuration_i, moveDuration_i)
      we define k independent random variables T_1,..., T_k so that
         T_i is uniform on interval [moveDuration_i, moveDuration_i + maxWaitDuration_i]
      prospectWeight = Expected[min{T_1,...,T_k}]
      for each (maxWaitDuration, moveDuration) on the list dependentMap[c']
         let T be uniform on interval [moveDuration, moveDuration + maxWaitDuration]
         prospectWeight = min(prospectWeight, Expected[min{T, T_1,...,T_k}]
      add edge PROSPECT_CLUSTER_SOURCE_c→PROSPECT_CLUSTER_TARGET_c'
         labeled AvgMinWalkWaitRideWalk with weight prospectWeight
```

ROUTE from A to L departing 8 AM:

from A to F choices:
walk to B, wait, board bus 101, ride to C  1401
walk to D, wait, board bus E34, ride to E
28 minutes
walk to F from F to H:
wait, board subway 2, ride to G  1406
walk to H from H to L choices: 32 minutes
wait
board bus 173, ride to J
board bus 105 or 107, ride to K
walk to L MAP depicting ROUTE from A to L

METHOD AND A COMPUTER SYSTEM FOR PROVIDING A ROUTE OR A ROUTE DURATION FOR A JOURNEY FROM A SOURCE LOCATION TO A TARGET LOCATION

CROSS-REFERENCE TO RELATED APPLICATIONS

This application is based upon, and claims the priority dates of, applications:

| [Country] | [Application Number] | [Filing Date] |
| --- | --- | --- |
| USA | 62/608,586 | Dec. 21, 2017 |
| USA | 62/613,779 | Jan. 5, 2018 |
| USA | 62/659,157 | Apr. 18, 2018 |
| South Korea | 10-2018-0045558 | Apr. 19, 2018 | which are incorporated herein by reference.

BACKGROUND OF THE INVENTION

The present invention relates to route planning in a metropolitan area. A goal of route planning is to determine how to travel from one location to other location using the vehicles available from various providers of transport services. Often it is required for the travel to last as little time as possible, or depart at a certain time, among other requirements. A route typically specifies instructions for a rider, including walk paths and vehicle ride paths.

BRIEF SUMMARY OF THE INVENTION

Embodiments include a method for computing routes, a computer system that implements and executes the method, and a computer service product that allows users to issue routing queries and receive routes as answers.

According to an embodiment of the present invention, a method for generating a route plan is provided. The method receives a query in a form of a source location and a target location of a route, and other requirements that may include a departure time or an arrival deadline. The method builds graphs that model statistical properties of the vehicles. One of the aspects is a "prospect edge" that models travel from a location to other location using any of a range of choices of vehicles and walks. In one embodiment, that edge models an expected minimum travel duration between the two locations. Using a graph, or its extension dependent on specifics of the query, the method generates a route plan as an answer to the query.

According to an embodiment of the present invention, a computer system for generating a route plan is provided. The system is a combination of hardware and software. It obtains information about the transportation system and walks among locations from a plurality of data providers. The system builds a plurality of graphs that model the transportation system, and computes shortest paths in graphs in order to generate a route plan.

According to an embodiment of the present invention, a computer service product for generating a route plan is provided. The service allows a user to specify queries through a User Interface on a device, including a smartphone, and displays generated route plans on the device.

The embodiments of the invention presented here are for illustrative purpose; they are not intended to be exhaustive. Many modifications and variations will be apparent to those of ordinary skill in the art without departing from the scope and spirit of the embodiments.

The data retrieval, processing operations, and so on, disclosed in this invention are implemented as a computer system or service, and not as any mental step or an abstract idea that is disembodied.

In the presentation, the terms "the first", "the second", "the", and similar, are not used in any limiting sense, but for the purpose of distinguishing, unless otherwise is clear from the context. An expression in a singular form includes the plural form, unless otherwise is clear from the context.

BRIEF DESCRIPTION OF THE SEVERAL VIEWS OF THE DRAWING

The drawings included in the present invention exemplify various features and advantages of the embodiments of the invention:

FIG. 9: depicts pseudocode for computing prospect edges under the interval model of wait durations and fixed travel durations according to an embodiment of the invention;

DETAILED DESCRIPTION OF THE INVENTION

4 Detailed Description

Figure 1:
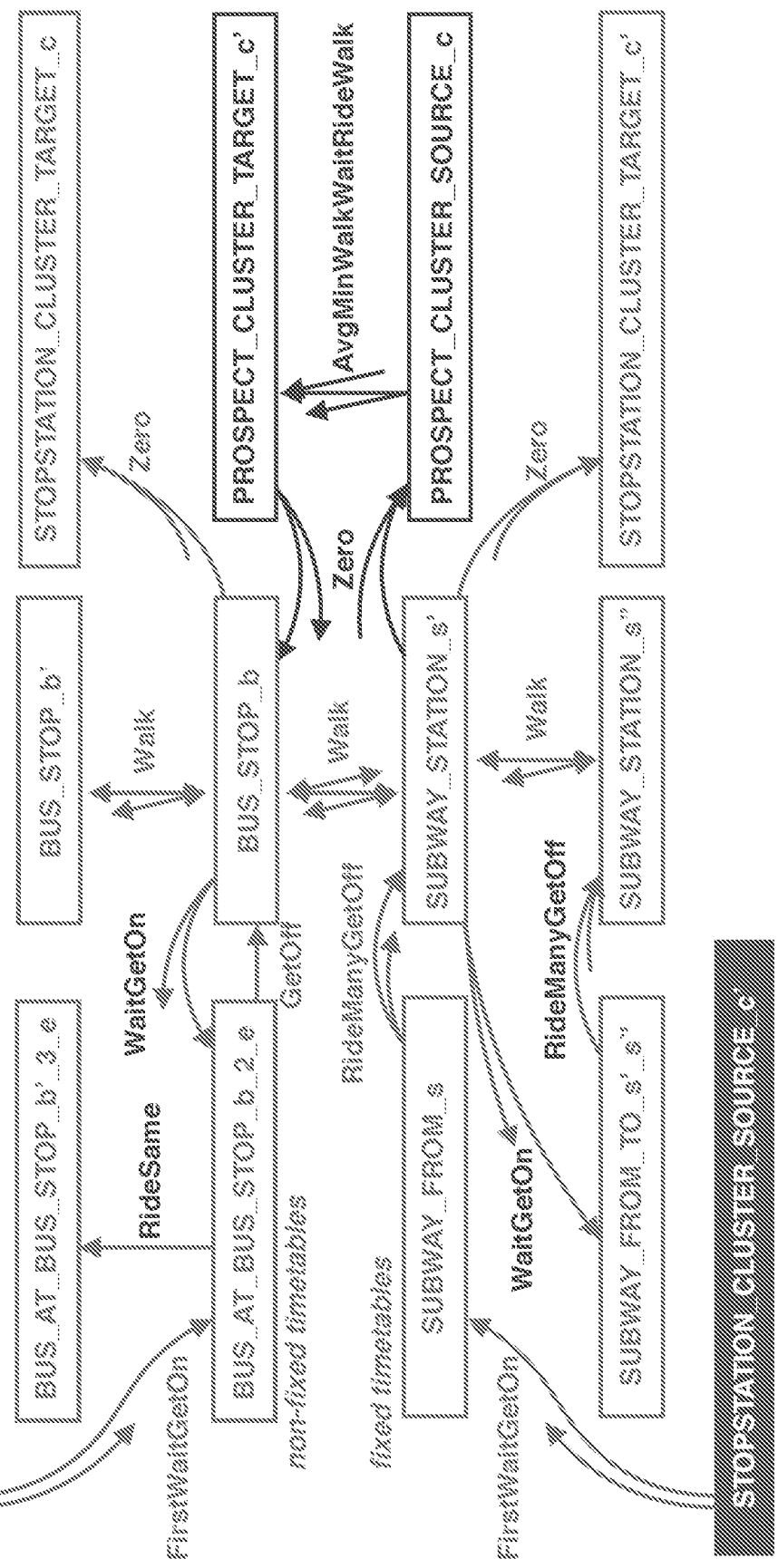
FIG. 1: depicts a graph G0 according to an embodiment of the invention.

A metropolitan transport system is composed of vehicles, for example subways and buses. A common goal for a rider is to determine a fastest route from a given location to other location within the metropolitan area. A route can be computed using timetables of the vehicles, and a desired departure time or arrival deadline, as can be seen at major providers of mapping services online. However, in practice some vehicles do not follow timetables exactly, for example due to traffic. In contrast to prior art, the present invention teaches how to compute routes using a mix of vehicles that follow, and not follow, the timetables. The invention utilizes route similarities and wait durations to improve routing results.

Let us illustrate the improvements with a simple example. Consider two consecutive bus stops $b_1$ and $b_2$ along the route of a bus. A ride takes 20 minutes on average. Suppose further that the bus arrives at $b_1$ every 24 minutes on average. For a rider arriving at $b_1$ at a random time, the average travel duration to $b_2$ is 32 minutes (wait+ride). Now, suppose that there is other bus that also rides between these two bus stops. Under the same timing assumptions, and assuming independence of the buses, the average travel duration is four minutes shorter. In general, with n buses, the average is $20+24/(n+1)$ minutes. This simply is because the rider can board a bus that arrives at $b_1$ first.

However, a natural metropolis is more complicated than our simple illustration: there can be sophisticated overlap patterns of routes, with vehicles having differing arrival and speed patterns. It is not even strictly necessary for routes to overlap to achieve improvements, as riders may walk among vehicle stops. The transport system may evolve over time, as subway timetables change and bus routes get added, for example. Besides, we desire an efficient method for computing routes, so as to enable a computer to quickly answer many routing queries even for the largest metropolitan areas.

4.1 Model Outline

We introduce a model of a transport system for computing routes or route durations.

We assume that the transport system is composed of two types of vehicles: (1) vehicles that follow fixed timetables, departing and arriving at predetermined times of the day, for example according to a schedule for weekdays; we call this vehicle a subway, and call its stops subway stations, (2) vehicles whose departure and arrival times are not fixed; we call this vehicle a bus, and its stop bus stops. Both subway stations and bus stops have fixed geographical locations, so we can determine walks among them. Buses are grouped into bus lines. Any bus of a bus line rides along a fixed sequence of bus stops, commonly until the terminal bus stop of the bus line.

In practice, some buses may quite punctually arrive, which may appear to not conform with our model. For example, consider a bus dispatched from the first bus stop of the bus line according to a fixed timetable. The bus may punctually arrive at the first few stops, until reaching an area of the metropolis with unpredictable traffic. When a rider arrives at one of these first bus stops after a subway ride, the wait duration for the bus is predictable, and so is the total subway-walk-bus travel duration. We can model this case by conceptually adding a subway to represent this multi-vehicle subway-walk-bus travel. Similarly, we can conceptualize bus-walk-subway, bus-walk-bus, and subway-walk-subway, and other combinations, when the rides are synchronized or quite punctual. To simplify the presentation of the disclosure, we maintain our assumption of fixed-timetable subways and non-fixed-timetable buses in the rest of this invention description.

Our method is not restricted to routing people by buses or subway. In contrast, our method is more general. It captures many kinds of vehicles that occur in practice. For example, these include: a subway, a bus, a tram, a train, a taxi, a shared van, a car, a self-driving car, a ferry boat, an airplane, a delivery motorbike, a cargo lorry, or a container truck. A route produced by our method can be used to route any object. For example, these include: a person, a cargo, a package, a letter or a food item. We sometimes refer to this object as a rider.

The transport system is modeled through a collection of directed graphs, each consisting of vertices and edges. Each vertex represents a bus stop, a subway station, or an auxiliary entity. Other examples of vertex representations include a train station, a taxi stand, a shared van pickup or drop-off location, a car park, a self-driving car pickup or drop-off location, a platform, a floor, a harbor, a ferry or air terminal, an airport, or a loading dock. Any edge represents a wait, a travel from one to other location, or an auxiliary entity. In one embodiment, an edge has a weight denoting a duration of wait or travel. In other embodiment, a weight is a random variable. In other embodiment, some random variables are conditioned, for example on the time of the day, holiday/non-holiday day type, among others. In other embodiment, some random variables may be correlated with other random variables.

In one embodiment, we determine a probability distribution for a random variable from historical data. For example, we measure how long a bus of a given bus line took to travel from a given bus stop $b_1$ to a given bus stop $b_2$ throughout a period of a month, and determine an empirical distribution of travel duration from this one month of samples. In other example, we measure arrival or departure times of a bus of a given bus line from a given bus stop over a period of time, and determine an empirical distribution of a wait time for a bus of the bus line, for each minute of a weekday. In other example, we use a passing interval reported by a bus operator to determine an average wait time. In other example, a current location of a bus is used to compute a more accurate distribution of a wait duration for the bus.

Some of the random variables used in our method are non-trivial. A trivial random variable has just one value with probability 1. Any other random variable is non-trivial.

A goal of any graph is to help answer any query to find a route or a route duration between any two geographical locations. The starting point of a route is called a source, and the ending point called a target. The locations are determined by the application of the routing system. For example, the locations could be commercial enterprises, bus and subway stations themselves, arbitrary points in a park, or the current location of a person determined by a Global Positioning System. In one embodiment, we search for a route by applying a Dijkstra's shortest paths algorithm or an A* (A star) search algorithm to a graph, or some adaptations of these algorithms as discussed later.

In some embodiments, we add restrictions on routes. For example, these include: a vehicle type, a vehicle stop type, a threshold on the number of vehicle transfers, a threshold on a wait duration, a threshold on a walk duration, a type of object being routed which may fit in only specific vehicles, a threshold on a monetary cost of travel, a departure time from the source, an arrival time at the target, or a desired probability of arriving before a deadline.

In one embodiment, our method computes routes or route durations that have a smallest expected duration. However, our method is more general. It also computes routes or route durations that are approximately fastest, or that may not be fastest, but that limit the risk of arriving after a given deadline.

Our invention builds several graphs to answer routing queries. Some embodiments extend a graph with extra vertices and edges based on the query.

4.2 Graph G0

Figure 2:
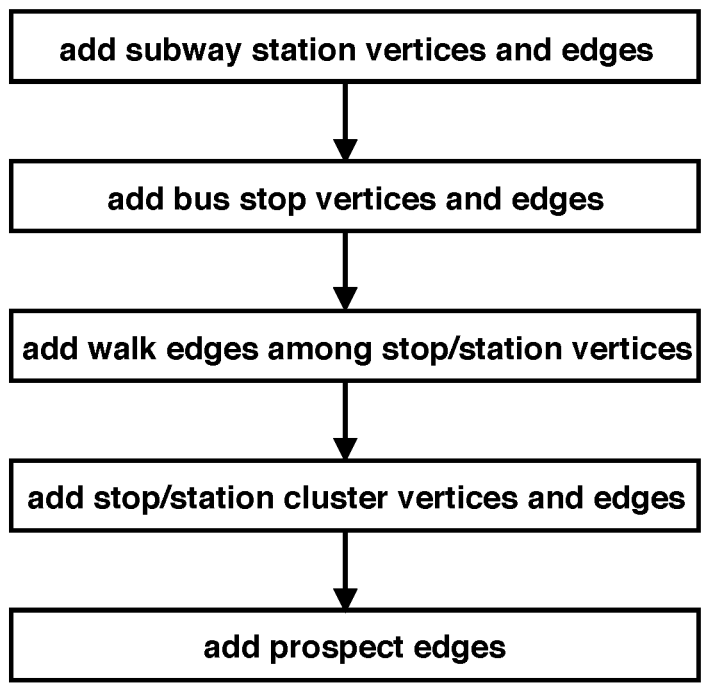
FIG. 2: depicts a process flow for constructing graph G0 according to an embodiment of the invention.

The graph called G0 represents routing among bus stops and subway stations. A detailed description of its construction follows. An illustration of a graph G0 is in FIG. 1, and an illustration of the process flow of the construction is in FIG. 2.

4.2.1 Fixed Timetables

The first group of vertices and edges represents routing by vehicles that follow fixed timetables. Because timetables are fixed, we can use a known algorithm to compute a fastest route between two locations, that can involve a sequence of multiple vehicles with walks in-between. Hence, we use a single edge to abstract this multi-vehicle travel from a source to a target.

We add vertices that model boarding subway without waiting, as if the rider timed their arrival at a station with a departure of the subway. We introduce two vertices for each subway station s:

SUBWAY_FROM_s and

SUBWAY_STATION_s.

For any two distinct stations s' and s'', we have an edge

SUBWAY_FROM_s→SUBWAY_STATION_s' representing a ride duration from s to s', possibly involving changing subways and walking (for example from station s, first take subway A to station B, then walk to station C, then take subway D to station s'); the edge is labelled RideMany-GetOff. In one embodiment, the weight of the edge is a minimum ride duration during weekday morning rush hours. In other embodiment, we use a random variable for each of many time windows. In other embodiment, the random variable is conditioned on an arrival time of the rider at a location of s, or a departure time from a location of s.

We model an event when a rider arrives at a subway station later during travel, and may need to wait for the subway. For any two distinct stations s' and s'', we add a vertex SUBWAY_FROM_TO_s'_s'' that denotes riding from s' to s''. There is an edge

SUBWAY_STATION_s'→SUBWAY_FROM_TO_s'_s'' labelled WaitGetOn representing a wait duration to get on a subway traveling from s' to s''. In one embodiment, the weight of the edge is set to an average wait for a subway that transports the rider to s'' the earliest, given the rider arriving at s' at a random time during weekday morning rush hours. In other embodiment, the weight is set to half of an average interarrival time of any subway from s' to s''. In other embodiment, we use a random variable for each of many time windows. In other embodiment, the random variable is conditioned on an arrival time of the rider at a location of s', or a distribution of the arrival time.

We add an edge

SUBWAY_FROM_TO_s'_s''→SUBWAY_STATION_s'' labelled RideManyGetOff representing a ride duration from s' to s'' possibly involving changing subways and walking. In one embodiment, the weight of the edge is set to an average shortest ride duration during weekday morning rush hours. In other embodiment, we use a random variable for each of many time windows. In other embodiment, the random variable is conditioned on an arrival time of the rider at a location of s', or a departure time from a location of s'.

4.2.2 Non-Fixed Timetables

The second group of vertices and edges represents routing by vehicles that do not follow fixed timetables.

For every bus line, we add vertices that model its bus stops, and a bus at the bus stops. The former abstracts a rider outside the bus, the latter a rider inside the bus. Let $b_1, \ldots, b_n$ be the n consecutive bus stops along a bus line e (including on-demand stops). Then we add vertices BUS_STOP_$b_k$ and BUS_AT_BUS_STOP_$b_k$_k_e, for each k, $1 \leq k \leq n$. Two bus lines may share a bus stop. There is an edge BUS_AT_BUS_STOP_$b_k$_k_e→BUS_STOP_$b_k$ labelled GetOff denoting disembarking the bus at this bus stop; the edge has zero weight. There is an edge in the reverse direction BUS_STOP_$b_k$→BUS_AT_BUS_STOP_$b_k$_k_e labelled WaitGetOn representing a duration of waiting for a bus of bus line e at bus stop $b_k$ before embarking. In one embodiment, the weight of the edge is set to half of an average interarrival time of a bus of bus line e during weekday morning rush hours, which is the same for every bus stop of that bus line. In other embodiment, we use a random variable for each of many time windows and bus stops. In other embodiment, the random variable is conditioned on an arrival time of the rider at a location of $b_k$, or a distribution of arrival time.

To model travel inside the same bus, we add an edge

BUS_AT_BUS_STOP_$b_k$_k_e→BUS_AT_BUS_STOP_$b_{k+1}$_k+1_e labelled RideSame representing a duration of a ride from bus stop $b_k$ to the next bus stop $b_{k+1}$ by bus line e. In one embodiment, the weight of the edge is set to an average ride duration between these bus stops during weekday morning rush hours. In other embodiment, we use a random variable for each of many time windows and bus stops. In other embodiment, the random variable is conditioned on an arrival time of a bus at a location of $b_k$, or a departure time from a location of $b_k$.

4.2.3 Walks

We use walks to connect bus stop and subway station vertices.

In this and other sections of the invention disclosure we allow various requirements for walks. In one embodiment, we use a walk with a shortest duration at a specific speed of 4 km/h. In other embodiment, the weight is a random variable for each of several walk path requirements, including speed 6 km/h, avoid stairs, avoid dark streets. In other embodiment, we allow only walks with duration at most a fixed amount of time, for example one hour. In other embodiment, a walk is straight-line that ignores any obstacles. In other embodiment, a walk can include travel by a lift, a moving path, an elevator, or an escalator.

We add edges

BUS_STOP_b→BUS_STOP_b',

BUS_STOP_b→SUBWAY_STATION_s,

SUBWAY_STATION_s→BUS_STOP_b, and

SUBWAY_STATION_s→SUBWAY_STATION_s', for any b, b', s, s', when allowed by the requirements. Each edge is labelled Walk, and its weight represents a duration of a walk.

4.2.4 Constraints

Next we add auxiliary vertices that enable modeling a constraint on the first wait along a route. In one embodiment the wait is zero, which models a rider walking to the stop/station just early enough to catch a departing bus/subway, but not earlier. In other embodiment, the wait depends on a start time of travel, which models a rider starting the travel at a specific time; for example leaving home at 8 am.

We cluster bus stops and subway stations based on their geographical proximity. In one embodiment, we fix the cluster radius to 2 meters. In other embodiment, we select the number of clusters depending on a resource/quality trade-off required by the user of the routing system. In other embodiment, the cluster radius is 0 meters, in which case the clusters are simple replicas of bus stops and subway stations.

For each cluster c, we add a vertex
STOPSTATION_CLUSTER_SOURCE_c
and add edges connecting the cluster to its buses and subways:
STOPSTATION_CLUSTER_SOURCE_c→BUS_AT_BUS_STOP_$b_k$_k_e and
STOPSTATION_CLUSTER_SOURCE_c→SUBWAY_FROM_s,
when $b_k$ or s are in cluster c. The edges are labelled FirstWaitGetOn. In one embodiment, the weight of the edge is 0. In other embodiment, the weight of the edge is a random variable denoting a wait duration for a vehicle (bus e, or subway) conditioned on a time of arrival of the rider at the location of the vertex (bus stop $b_k$, or subway station s). In other embodiment, the weight is increased by a walk duration between c and $b_k$ or s, for example when cluster radius is large.

Note that any non-trivial path in the graph from
STOPSTATION_CLUSTER_SOURCE_c
will traverse that FirstWaitGetOn edge exactly once.

We add other auxiliary vertices. We cluster bus stops and subway stations similar as before, and for each cluster c, add a vertex
STOPSTATION_CLUSTER_TARGET_c
and edges
BUS_STOP_b→STOPSTATION_CLUSTER_TARGET_c and
SUBWAY_STATION_s→STOPSTATION_CLUSTER_TARGET_c,
for every b and s, when in cluster c. The edges are labelled Zero and have weight 0. In other embodiment, the weight is increased by a walk duration, for example when cluster radius is large.

The introduction of vertices
STOPSTATION_CLUSTER_TARGET_c
can help decrease the size of the graph when there are many routing target locations. In other embodiment, we can replace these vertices with direct edges from
BUS_STOP_b
and
SUBWAY_STATION_s
to the target, for any b and s when appropriate.

The graph constructed so far models a duration of travel from
STOPSTATION_CLUSTER_SOURCE_c
to
STOPSTATION_CLUSTER_TARGET_c',
for any c and c', such that the first bus or subway is boarded without waiting or with given waiting, and after the rider gets off the bus or the subway sequence, any subsequent vehicle ride requires waiting to board.

4.2.5 Prospect Edges

Next we add auxiliary vertices and edges that reflect improvements in travel duration due to using any of several vehicles. The improvements may be caused by a shorter wait for any vehicle, or a shorter ride by any vehicle.

The duration of waiting to board a vehicle can be modeled by assuming that the rider arrives at a stop/station at a random time, because of a stochastic nature of the vehicles that use non-fixed timetables. If there were two consecutive RideManyGet Off vehicle ride edges on a graph path, the edges could be replaced by one RideManyGetOff edge.

We introduce a prospect edge, which abstracts travel between two locations using one of several choices of vehicles. In one embodiment, the weight of the edge is the value of an expected minimum travel duration among these choices.

In this section, the two locations connected by a prospect edge are near vehicle stops. However, this is not a limitation of our method. Indeed, in a later section we describe a prospect edge that ends at an arbitrary location that may be far from any vehicle stop. In general, a prospect edge may connect arbitrary two vertices in a graph. However, for the sake of presentation, in this section we focus on prospect edges near vehicle stops.

Figure 3:
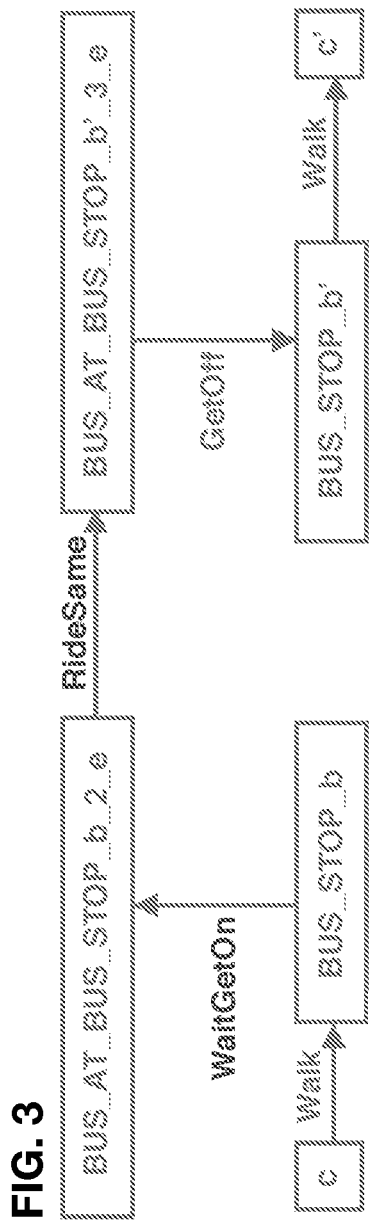
FIG. 3: depicts a travel from c to c' involving a walk, a wait, a bus ride, and a walk according to an embodiment of the invention.

We cluster bus stops and subway stations based on their geographical proximity, similar as before. Given two distinct clusters c and c', we consider any way of traveling from c to c' by a walk, followed by a bus ride, followed by a walk, any of the two walks can have length 0. For example, FIG. 3 depicts a case when there is a walk from c to vertex
BUS_STOP_b,
and from there a graph path involving bus line e with edges WaitGetOn, RideSame, and GetOff, ending at a vertex
BUS_STOP_b',
and then a walk from
BUS_STOP_b'
to c'. Let T be a random variable representing a duration of travel from c to c' using the walks from c to b and from b' to c', and a bus ride from b to b' modeled by a graph path. This variable is just a sum of the random variables of the graph edges along the path, plus the random variables of two front and back walks. Its distribution can be established from the constituent distributions. In one embodiment, we condition the random variable on a departure time from c.

In one embodiment, this random variable T is uniformly distributed on an interval [x, y], where the interval tips are
x=(minimum walk duration from c to b)
+(sum of an expected RideSame duration along the path edges)
+(minimum walk duration from b' to c'), and
y=x+2·(expected WaitGetOn duration).
In other embodiment, the tips are adjusted by a multiplicity of a standard deviation of the random variables. In other embodiment, we consider c, b, b', c' only when the walk durations from c to b and from b' to c' are at most a fixed amount time, for example one hour. In other embodiment, any of the walks may be zero-length (an optional walk). In other embodiment, we require a shortest duration walk from c to b, or from b' to c'. In other embodiment, walks may have embodiments as in Section 4.2.3. In other embodiment, the random variable T is non-uniform. In other embodiment, the random variable T is conditioned on an arrival time of the rider at a location of c.

Figure 4:
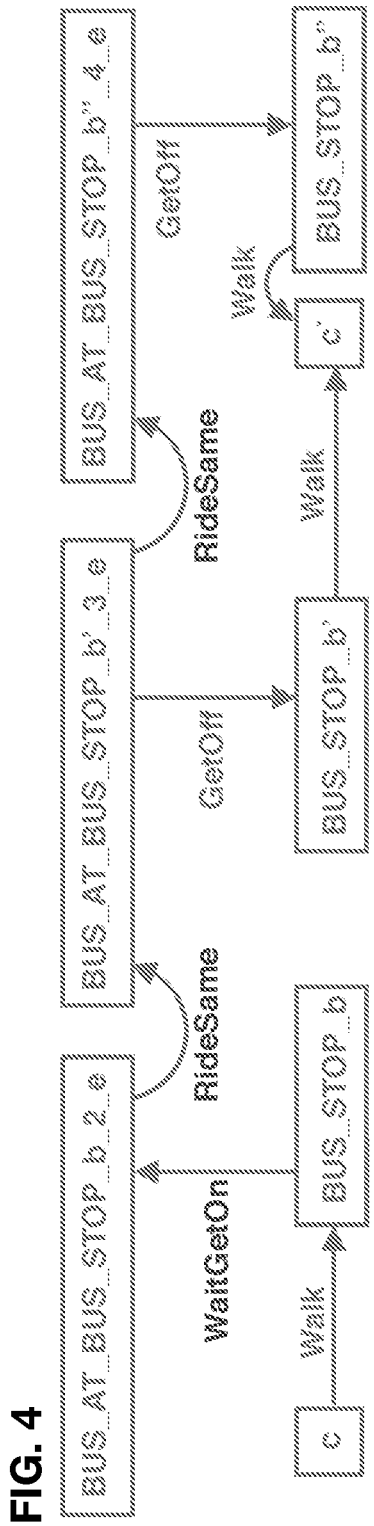
FIG. 4: depicts a travel from c to c' involving one bus line but two ways of travel according to an embodiment of the invention.

For a fixed bus line e, there may be many alternatives for traveling from c to c', because the rider can board/get off at various bus stops of that bus line, and use walks for the rest of the travel. For example, FIG. 4 extends FIG. 3 by showing an alternative ride: to one further stop
BUS_STOP_b"
that increases a total ride duration, but decreases a total walk duration. In one embodiment, from among these alternatives, we take a random variable T that has a lowest expectation. Let us denote this variable $T_{c,c',e}$. This is a fixed random variable for the bus line e, and the start and the end clusters c and c'. The variable denotes a fastest travel duration for getting from c to c' by the bus line e stochastically. In one embodiment, when the candidates for $T_{c,c',e}$ are uniformly distributed on intervals, a lowest expectation candidate is just a candidate with a smallest median value of its interval. In other embodiment, we use one variable for each of many time windows, for example so as to capture higher frequency of buses during peak hours, and also higher road traffic. In other embodiment, the random variable is conditioned on an arrival time of the rider at a location of c.

Figure 5:
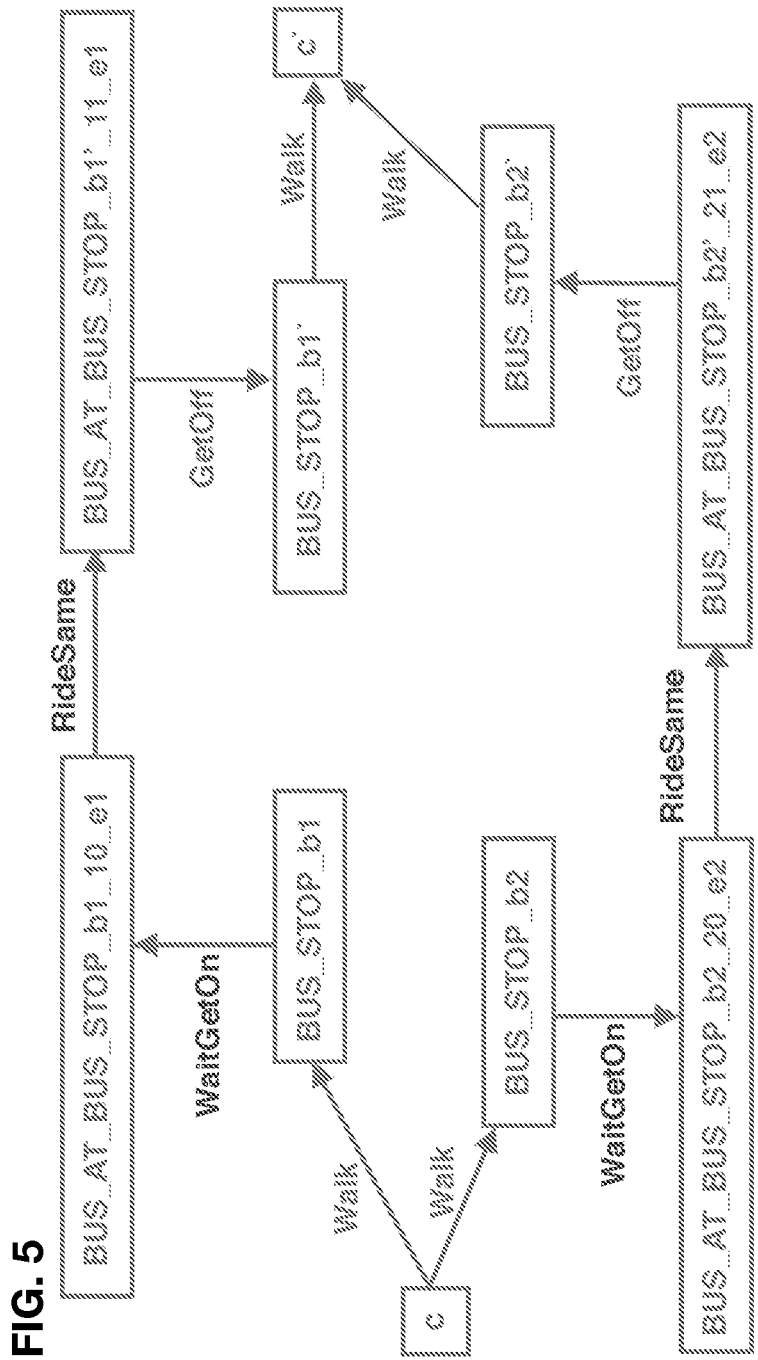
FIG. 5: depicts two bus lines, each offers a distinct way of travel from c to c' according to an embodiment of the invention.

Let us consider all bus lines $e_1$ through $e_n$ that can help transport a rider form c to c'. Note that the constituent walks and bus stops may differ. For example, FIG. 5 shows two bus lines $e_1$ and $e_2$, each using distinct bus stops, and having different walk durations. Let $T_{c,c',e_1}$ through $T_{c,c',e_n}$ be respective fastest travel duration random variables, as defined before.

We can compute an expected minimum of the variables $E[\min_{1 \le i \le n} T_{c,c',ci}]$. This expectation models travel duration by "whichever bus will get me there faster". In one embodiment, the random variables of different bus lines are independent. That is $T_{c,c',e_i}$ is independent from $T_{c,c',e_j}$ for any two distinct bus lines $e_i$ and $e_j$. In other embodiment, the random variables are independent uniform on a common interval [x, y]. Then an expected minimum is $(y+n \cdot x)/(n+1)$. In other embodiment, we compute the expectation through a mathematical formula, approximate integration, random sampling, or other approximation algorithm or a heuristic for an expected minimum. When an approximation algorithm is used, then our method no longer produces shortest routes, but instead produces approximately shortest routes.

Figure 6:
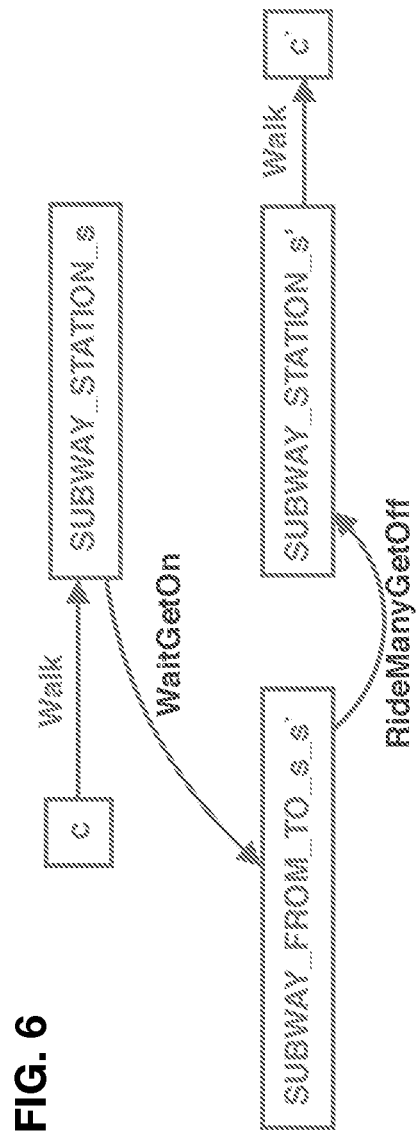
FIG. 6: depicts a travel from c to c' involving a walk, a wait, a subway ride, and a walk according to an embodiment of the invention.

Now we discuss how to include subways into a computation of an expected minimum travel duration. Similar to buses, let $T_{c,c',s,s'}$ be a random variable of fastest travel duration from c to c' using walks and subway rides. As illustrated in FIG. 6, there is a walk from c to s, a path in the graph SUBWAY_STATION_s
→SUBWAY_FROM_TO_s_s'
→SUBWAY_STATION_s', and a walk from s' to c'. A distribution of this variable can be established from constituent distributions. In one embodiment, we condition the random variable on a departure time from c.

In one embodiment, $T_{c,c',s,s'}$ is uniformly distributed on an interval [x, y], where the interval tips are x=(minimum walk duration from c to s)
+(expected RideManyGetOff duration on the graph path)
+(minimum walk duration from s' to c'), and
y=x+2·(expected WaitGetOn duration on the graph path).

In other embodiment, the tips are adjusted by a multiplicity of a standard deviation of the random variables. In other embodiment we restrict the walk durations from c to s and from s' to c' to at most a fixed amount time, for example one hour. In other embodiment, any of the walks may be zero-length (an optional walk). In other embodiment, we require a shortest duration walk from c to s, or from s' to c'. In other embodiment, walks may have embodiments as in Section 4.2.3. In other embodiment, $T_{c,c',s,s'}$ is non-uniform. In other embodiment, $T_{c,c',s,s'}$ is conditioned on an arrival time of the rider at a location of c. In other embodiment, we use one variable for each of many time windows.

A complication arises in that the subway random variables are pairwise dependent, because they are derived from fixed subway schedules. This may complicate a computation of an expected minimum travel duration from c to c'.

Let us consider all subway rides that can help transport a rider from c to c', and let $s_1, s'_1, \ldots, s_m, s'_m$ be the m embarkation and disembarkation subway stations with the respective random variables through $T_{c,c',s_1,s'_1}$ through $T_{c,c',s_m,s'_m}$.

In one embodiment, any one subway random variable together with all bus line random variables are independent. In that case we can compute an expected minimum travel duration for buses and subways as a minimum of expected minima, adding one subway ride at a time to the pool of bus rides, and denote it as P(c, c'), as in the following equation:

$$P(c,c') = \min_{1 \le j \le m} E[\min(T_{c,c',s_j,s'_j}, T_{c,c',e_1}, \ldots, T_{c,c',e_n})]. \quad (1)$$

We call P(c, c') a prospect travel, because it is a travel form c to c' involving any of several transportation choices, opportunistically. We call the m n constituent random variables $T_{c,c',s_j,s'_j}$ and $T_{c,c',ci}$ the choices.

In one embodiment, $T_{c,c',e_i}$ is uniform over an interval, and so is $T_{c,c,s_j,s'_j}$. In that case we compute an expected minimum $E[\min T_i]$, for some number of $T_i$, each uniform over an interval $[x_i, y_i]$.

Figure 7:
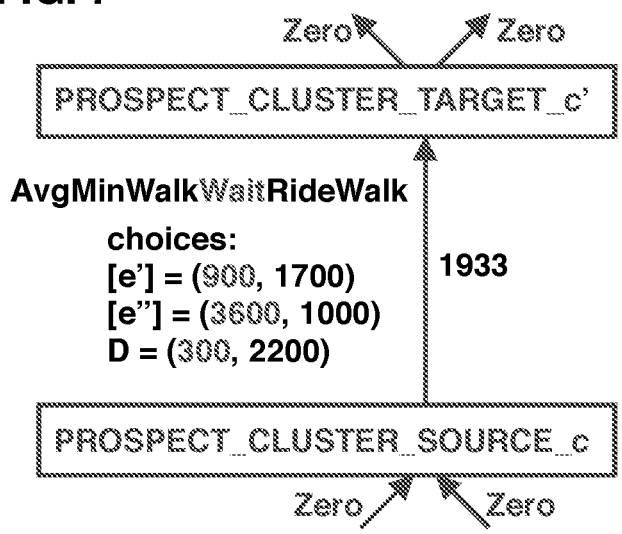
FIG. 7: depicts a prospect edge for three choices for travel from c to c' according to an embodiment of the invention.

For example, FIG. 7 shows travel from c to c' involving three choices:

bus line e' with wait uniform on [0,900] and walk&ride 1700, bus line e" with wait uniform on [0,3600] and walk&ride 1000, subway with wait uniform on [0, 300] and walk&ride 2200.

In that case a minimum expected travel duration is 2150=min{2150, 2800, 2350}, which does not reflect improvements from travel by "whichever is faster". However, an expected minimum is lower: P(c, c')=1933.

Figure 8:
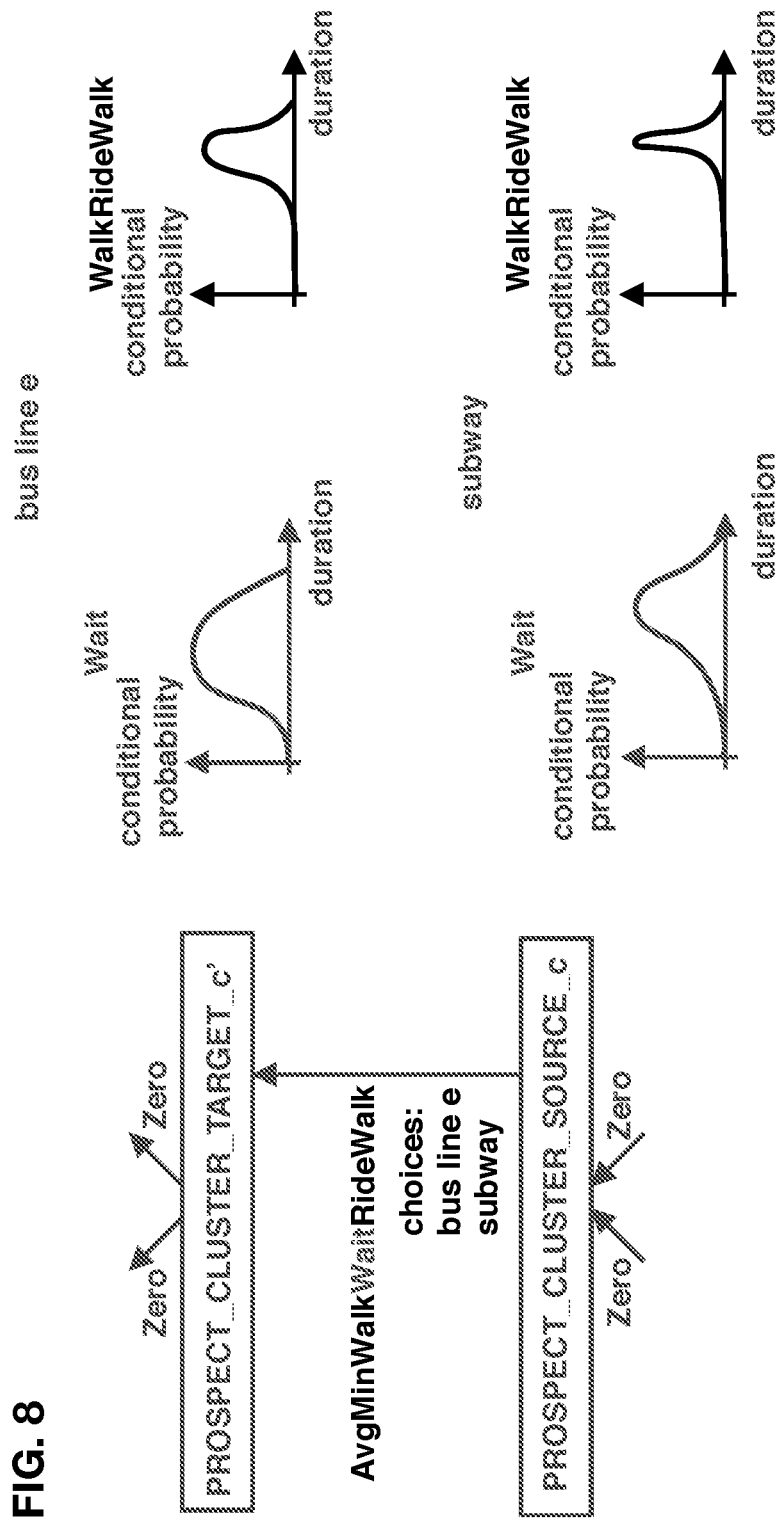
FIG. 8: depicts a prospect edge for two choices for travel from c to c' given duration random variables conditioned on the time of arrival of the rider at c according to an embodiment of the invention.

In other example, FIG. 8 illustrates probability distributions conditioned on a time when the rider arrives at c (the source of a prospect edge). There are two choices of getting from c to c', one by bus and the other by subway. Each choice has its own conditional probability distributions for wait and for walks and ride.

There is a gain in duration due to a prospect travel, if the value of P(c, c') is less than a minimum of expectations $\min(\min_{1 \le j \le m} E[T_{c,c',s_j,s'_j}], \min_{1 \le i \le n} E[T_{c,c',e_i}])$. In that case, we add to the graph: vertices PROSPECT_CLUSTER_SOURCE_c
and
PROSPECT_CLUSTER_TARGET_c',
and an edge
PROSPECT_CLUSTER_SOURCE_c→
PROSPECT_CLUSTER_TARGET_c' labelled AvgMinWalkWaitRideWalk with the weight P(c, c'). We also add edges from bus and subway stations of the cluster c to the vertex PROSPECT_CLUSTER_SOURCE_c,
and edges from the vertex
PROSPECT_CLUSTER_TARGET_c' to bus and subway stations in the cluster c'; these edges are labelled Zero and have zero weight. In one embodiment we add the prospect edge only when its weight P(c, c') results in a gain that is above a threshold, for example at least 10 seconds.

We remark that our method does not require the rider to board a first arriving of the transportation choices, simply because a subsequent choice, even though requiring a longer wait, may arrive at the destination faster (consider an express bus versus an ordinary bus). Our method does not even require boarding a bus at the same stop/station, because the rider may walk to other stop/station, for example anticipating an express train departing from there.

Definition 1 [062] In one embodiment, prospect travel is defined in terms of:
- any two locations c and c',
- any number k≥2 of random variables $T_1, \ldots, T_k$, each representing a duration of travel from c to c',
- the k variables are independent, dependent, or correlated arbitrarily,
- any of the k variables may be conditioned on a time A of arrival of the rider at a location c; the time A may be a random variable.

The duration of prospect travel is a minimum $\min(T_1, \ldots, T_k)$, which by itself is a random variable. The weight of a prospect edge is an expected value of this minimum $P(c, c') = E[\min(T_1, \ldots, T_k)]$.

In other embodiment, a random variable $T_i$ is distributed uniformly on an interval. In one embodiment, a random variable $T_i$ is conditioned on an arrival time at c that falls within a specific time window, or a probability distribution of arrival time at c.

In one embodiment, in order to determine the random variables $T_1, \ldots, T_k$, we determine a list of vehicle stops near c and durations of walks to these stops from c, and a list of vehicle stops near c' and duration of walks from these stops to c', and then for each pair of vehicle stops on the two lists, we determine a travel duration random variable.

In one embodiment, we compute various statistics on a random variable $\min(T_1, \ldots, T_k)$. One is the already mentioned expected value. But we also compute a probability mass, which can be used to determine an arrival time that can be achieved with a specific probability. In order to compute these statistics, we use several methods, including sampling, a closed-form formula, approximate integration, and other approximation algorithm or a heuristic.

In one embodiment, we pre-compute a component of prospect travel and store it, so that when prospect travel needs to be determined, we can retrieve the component from storage and avoid computing the component from scratch. Examples of such components include: a random variable of a duration of travel between a pair of vehicle stops; an expected minimum of two or more travel duration random variables; a probability distribution of a minimum of at least two travel duration random variables; or a path or a travel duration between a pair of vehicle stops.

So far we have defined how to compute a prospect edge for a given c and c'. We apply this definition to all pairs of distinct c and c', which determines which prospect clusters get connected, and which do not get connected, by a prospect edge, and of what weight.

In one embodiment, instead of considering a quadratic number of c and c' pairs, we perform a graph traversal. In one embodiment, we use a "forward" traversal from vertex
PROSPECT_CLUSTER_SOURCE_c,
for each c, towards every vertex
PROSPECT_CLUSTER_TARGET_c'
that is reachable by walk-bus/subway-walk. During this traversal, we identify the graph paths that lead to the
PROSPECT_CLUSTER_TARGET_c',
for each c'. Once we have identified all such paths for a specific c', we have computed all the choices between the
PROSPECT_CLUSTER_SOURCE_c
and the
PROSPECT_CLUSTER_TARGET_c',
and thus can compute an expected minimum of these choices (see FIG. 9 for a further example). Because we limit the exploration to only the reachable parts of the graph, we can often compute prospect edges more efficiently. In one embodiment, we use a symmetric method of a "backward" traversal from vertex
PROSPECT_CLUSTER_TARGET_c',
for each c', backwards to every vertex
PROSPECT_CLUSTER_SOURCE_c
that is reachable by a "reversed" path walk-bus/subway-walk.

FIG. 9 illustrates an embodiment of the process of adding prospect edges to graph G0, in the case when any wait duration is uniformly distributed on an interval [0,2·Wait-GetOn] for the respective edge, and a ride duration is deterministic.

4.3 Extensions of Graph G0

We describe extensions to the graph G0. Each extension is useful for a specific kind of routing queries.

4.3.1 Sources Known Beforehand

In some embodiments the source locations of routing queries are known in advance. For example, suppose that we are interested in finding a shortest route from every restaurant in the metropolitan area, and the restaurant locations are known. This can be achieved with the help of an extended graph G0.

Figure 10:
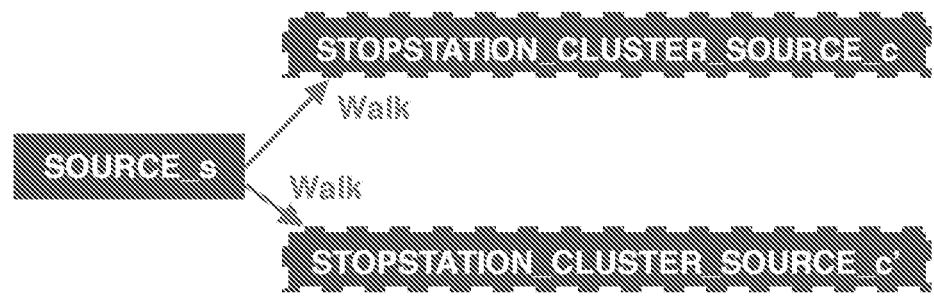
FIG. 10: depicts how graph G1 extends graph G0 with edges from sources, when sources in queries are known according to an embodiment of the invention.

In one embodiment, for each such source s, we add a vertex
SOURCE_s.
See FIG. 10 for an illustration. In one embodiment, we add an edge from
SOURCE_s
to any bus stop and subway station cluster
STOPSTATION_CLUSTER_SOURCE_c
in the graph G0. The edge is labelled Walk, and its weight represents a duration of a walk. In other embodiment, we use a shortest walk with duration that is at most a threshold, or other embodiments as in Section 4.2.3.

The resulting graph is denoted G1 (it includes G0). G1 can be used to compute shortest paths from any
SOURCE_s
to any
STOPSTATION_CLUSTER_TARGET_c.
In one embodiment, some paths are pre-computed, stored, and retrieved from storage when a query is posed.

In other embodiment, we use a symmetric method when targets are known beforehand: for each target t, we add a vertex
TARGET_t,
and add an edge from any
STOPSTATION_CLUSTER_TARGET_c
to any
TARGET_t
labelled Walk. The resulting graph is denoted G1'.

4.3.2 Targets Known Beforehand

In some embodiments the target locations of routing queries are known in advance, and we extend G0 with prospect edges to the targets.

For each target t, we add a vertex
TARGET_t.

Figure 11:
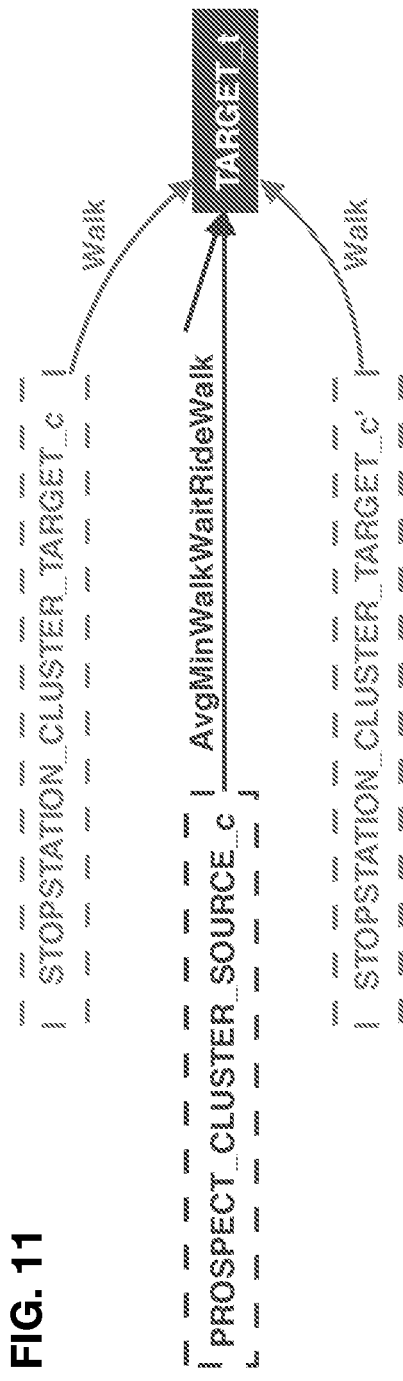
FIG. 11: depicts how graph G2 extends graph G0 with prospect edges to targets, when targets in queries are known according to an embodiment of the invention.

See FIG. 11 for an illustration. In one embodiment, we add an edge from any bus stop and subway station cluster
STOPSTATION_CLUSTER_TARGET_c
in graph G0 to
TARGET_t.
The edge is labelled Walk, and its weight represents a duration of a walk. In other embodiment, we use a shortest walk with duration that is at most a threshold, or other embodiments as in Section 4.2.3.

We add prospect edges according to a process similar to Section 4.2.5. Specifically, for any
PROSPECT_CLUSTER_SOURCE_c
and
TARGET_t,
we determine all paths from c to t of two kinds:
(1) a ride by a bus with walks: walk from c to b, graph path
BUS_STOP_b
→BUS_AT_BUS_STOP_b_i_e
. . .
→BUS_AT_BUS_STOP_b'_j_e
→BUS_STOP_b'
→STOPSTATION_CLUSTER_TARGET_c"
→TARGET_t,
(2) a ride by subways with walks: walk from c to s', graph path
SUBWAY_STATION_s'
→SUBWAY_FROM_TO_s'_s"
→SUBWAY_STATION_s"
→STOPSTATION CLUSTER TARGET c'
→TARGET_t.
In other embodiment, we use a shortest walk with duration that is at most a threshold, or other embodiments as in Section 4.2.3. We define the random variables of travel duration along each path just like in Section 4.2.5.

In one embodiment, we assume that the kind (1) are independent random variables, and the kind (2) are dependent. And then we compute an expected minimum travel duration by considering a pool of all kind (1) random variables (appropriately removing duplicates for repeated bus lines), adding to the pool one kind (2) random variable at a time, like in Equation 1 for P(c, c'). In other embodiment, we use Definition 1 of prospect travel. This defines P(c, t), called prospect travel from c to t.

When there is gain in travel duration over a minimum of expectations, we add an edge from
PROSPECT_CLUSTER_SOURCE_c
to
TARGET_t
labelled AvgMinWalkWaitRideWalk with weight P(c, t). We use similar embodiments to these we used for the edge from
PROSPECT_CLUSTER_SOURCE_c
to
PROSPECT_CLUSTER_TARGET_c'
defined before.

In one embodiment, we use a "forward" or a "backward" graph traversal as described in Section 4.2.5 to speed up a computation of prospect edges between
PROSPECT_CLUSTER_SOURCE_c
and
TARGET_t,
for all c and t. In other embodiment, this traversal could be merged into a traversal when computing prospect edges in G0.

The resulting graph is denoted G2 (it includes G0). G2 can be used to compute shortest paths from any
STOPSTATION_CLUSTER_SOURCE_c
to any
TARGET_t.
In one embodiment, some paths are pre-computed, stored, and retrieved from storage when a query is posed.

In other embodiment, we use a symmetric method when sources are known beforehand: for each source s, we add a vertex
SOURCE_s,
and compute a prospect edge from any
SOURCE_s
to any
PROSPECT_CLUSTER_TARGET_c.
The resulting graph is denoted G2'.

4.3.3 Source Revealed when Query is Posed, Targets Known

In some embodiments the target locations of routing queries are known in advance, but the source is revealed only when a query is posed.

In one embodiment, we use the graph G2 of Section 4.3.2 to compute a shortest ride.

When a query (s, t) is posed, we determine walks from the location of s to each
STOPSTATION_CLUSTER_SOURCE_c.
In one embodiment, we use a shortest walk with duration that is at most a threshold, thereby generating a list of vehicle stops near the source location, or other embodiments as in Section 4.2.3. We also determine a shortest travel continuation from
STOPSTATION_CLUSTER_SOURCE_c
to
TARGET_t
in graph G2. In one embodiment, we pre-compute shortest path duration from each
STOPSTATION_CLUSTER_SOURCE_c
to each
TARGET_t,
and store the results. We look up these results from storage when a query is posed. In other embodiment, we use a graph shortest path algorithm in G2 to compute a duration when a query is posed.

We find a cluster c that minimizes a sum of durations of a walk from s to c and a travel continuation from c to t. This minimum is a shortest travel duration from s to t.

In other embodiment, we use a symmetric method when a target is revealed only when a query is posed. Then, instead of generating a list of vehicle stops near the source location, we generate a list of vehicle stops near the target location.

In other embodiment, instead of using graph G2, we use graph G1'.

4.3.4 Target Revealed when Query is Posed, Sources Known

In some embodiments the source locations of routing queries are known in advance, but a target is revealed only when a query is posed.

In one embodiment the graph G1 of Section 4.3.1 is used to compute a shortest ride. However, we need to compute prospect edges to the target. This computation is more involved than Section 4.3.2, because the target is unknown beforehand.

We recall how choices were computed for each prospect edge in G0. For each clusters c and c', let choices(c, c') be these choices used to compute P(c, c') for the edge from
PROSPECT_CLUSTER_SOURCE_c
to
PROSPECT_CLUSTER_TARGET_c'
in G0. It is possible that choices(c, c') has just one choice (e.g., one bus, or one subway ride). The choices(c, c') is defined even if the prospect edge was not added in G0 due to lack of a sufficient gain.

Let the posed query be (s,t), for a source
SOURCE_s
in the graph G1, and an arbitrary target location t that may be not represented in the graph.

A shortest path from s to t may involve just one bus or only subways. In that case we need not consider prospect edges. We take the graph G1, and further extend it. We add vertex
TARGET_t,
and edges from
STOPSTATION_CLUSTER_TARGET_c,
for any c, to
TARGET_t.
Each of these edges is labelled Walk, and its weight is a walk duration. In one embodiment, any edge represents a shortest walk duration that is at most a threshold, or other embodiments as in Section 4.2.3. We compute a shortest path from
SOURCE_s
to
TARGET_t
in the resulting graph, and denote the path's length by A(s, t). This length is a candidate for a shortest travel duration from s to t.

Figure 12:
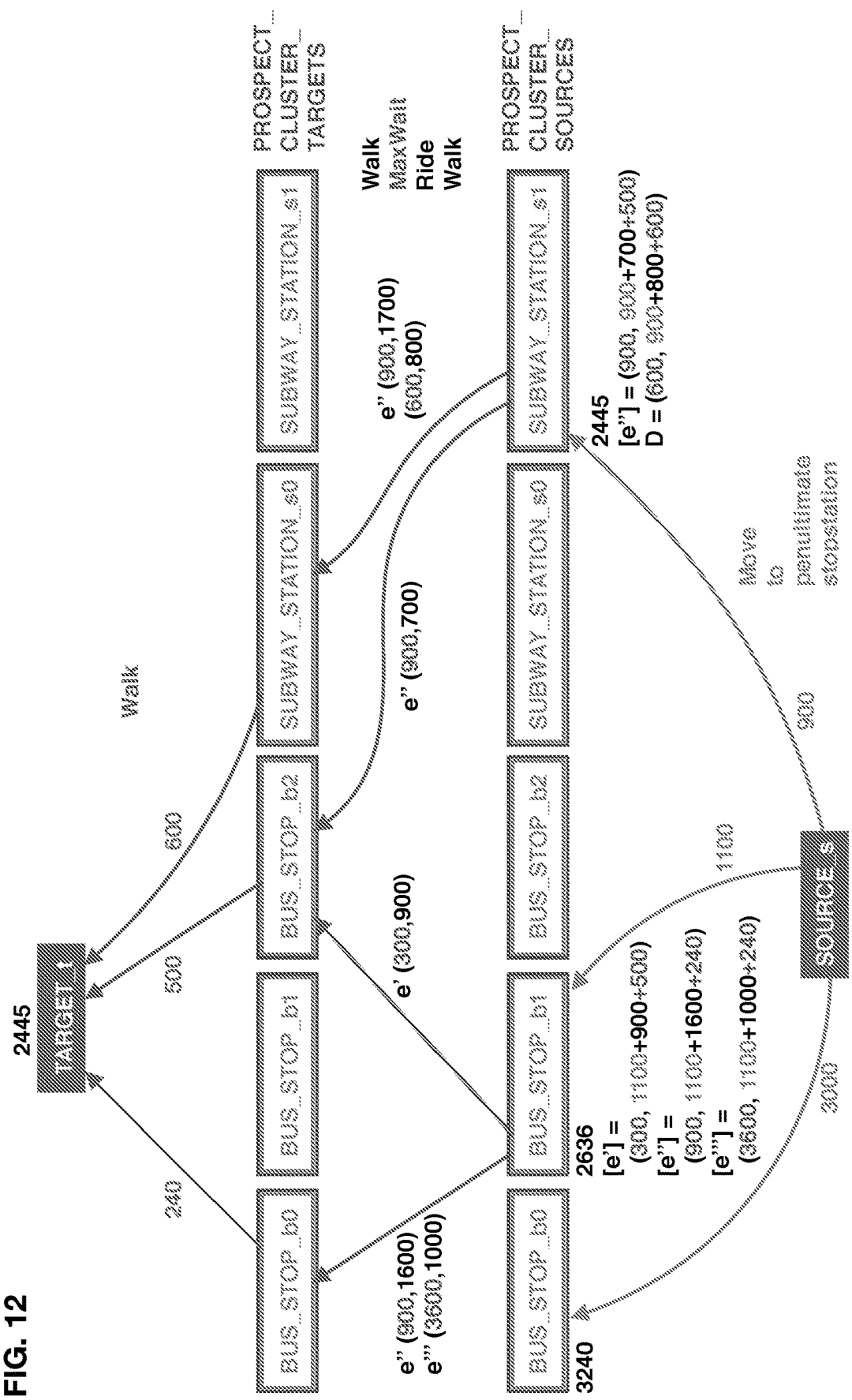
FIG. 12: depicts an example of computing choices for prospect travel continuing from a penultimate stop/station, when the target is revealed at query time according to an embodiment of the invention.

There is other candidate. It is also possible that a shortest path involves more vehicles. In that case, there is a penultimate stop/station along the path. To cover this case, we compute prospect edges to t. The process is illustrated in FIG. 12. To simplify the illustration, the drawing depicts singleton prospect clusters (each has just one bus stop, or just one subway station).

To compute prospect edges to t we start with a graph G1. We enumerate the parts of the journey form s to t that end at a penultimate stop/station. Specifically, we determine a shortest travel duration from
SOURCE_s
to
PROSPECT_CLUSTER_SOURCE_c,
for each c. We denote this duration by shortest(s→c). For example, in FIG. 12 the value 900 on the edge from
SOURCE_s
to
SUBWAY_STATION_$s_1$
denotes a shortest travel duration from
SOURCE_s
to
PROSPECT_CLUSTER_SOURCE_$s_1$.
Note that this travel may pass along a prospect edge in the graph G1. In one embodiment, this duration can be pre-computed and stored before queries are posed, and looked up from storage upon a query.

We determine how the journey can continue from each penultimate stop/station to the target t, using prospect edges and walks. For every
PROSPECT_CLUSTER_SOURCE_c,
we determine the choices of moving from c to t by first going to an intermediate
PROSPECT_CLUSTER_TARGET_c',
called choices(c, c'), and then following by a walk from c' to t. In one embodiment, we consider only shortest walks c' to t with duration that is at most a threshold, or other embodiments as in Section 4.2.3. For example, in FIG. 12 the choices($b_i$, $b_0$) are depicted on the edge from
BUS_STOP_$b_1$
to
BUS_STOP_$b_0$
there are two choices: bus line e" with wait duration uniform on [0,900] and travel duration 1600, and bus line e'" with wait duration uniform on [0,3600] and travel duration 1000. It takes 240 to continue by walk from
BUS_STOP_$b_0$
to
TARGET_t.
Because a rider located at c may pick any c' as a continuation, we combine at t the choices across all c'. This combination forms the choices for travel from c to t. For example, in FIG. 12 there is other edge from
BUS_STOP_$b_1$;
that edge goes to
BUS_STOP_$b_2$.
The choices($b_1$, $b_2$) depicted on that edge has just one choice: bus line e' with wait duration uniform on [0,300] and travel time 900. It takes 500 to continue by walk from
BUS_STOP_$b_2$
to
TARGET_t.
The combination of choices($b_1$, $b_0$) with choices($b_1$, $b_2$) yields three choices (bus lines e', e" and e'"). These are the choices of going from
BUS_STOP_$b_1$
to
TARGET_t.
An expected minimum travel time using these choices is 2636.

We need to eliminate duplicate bus rides by the same bus line, like in Section 4.2.5. For example, in FIG. 12 a rider can depart from
SUBWAY_STATION_$s_1$
using the same bus line e", but going to two different locations:
BUS_STOP_$b_2$
and
SUBWAY_STATION_$s_0$.
For any bus line at c, we retain only the choice for this bus line that has a lowest expected travel duration from c to t (eliminate any other choice for this bus line at c). For example, in FIG. 12 we eliminate the choice to
SUBWAY_STATION_$s_0$
because it has a higher expectation. We compute an expected minimum travel duration, P(c,t), among the remaining choices, similar to how we computed P(c, c') in Section 4.2.5.

A shortest path may pass any of the c, so we compute a minimum across c, and denote it B(s, t)

$$B(s,t)=\min_c\{\text{shortest}(s\to c)+P(c, t)\}.$$

For example, in FIG. 12 the minimum B(SOURCE_s, TARGET_t)=2445, which is min{2636, 2445}, because it is more advantageous for the rider to travel to a penultimate
SUBWAY_STATION_$s_1$,
rather than to a penultimate
BUS_STOP_$b_1$.
This quantity denotes a shortest travel duration from s to t that involves a penultimate vehicle. B(s,t) is the other candidate for a shortest travel duration from s to t.

Finally, a response to the query is a minimum of the two candidates: min{A(s, t), B(s, t)}.

For example, in FIG. 12 a response to the query is still 2445, because we cannot shorten travel by using just one vehicle that travels from
SOURCE_s
through
BUS_STOP_$b_0$
to
TARGET_t, because this travel duration is A(SOURCE_s, TARGET_t)=3000+240.

In other embodiment, instead of using graph G1, we use the graph G2'.

In other embodiment, we use a symmetric method that computes prospect edges from a source, when the source is revealed only when a query is posed. Then, instead of considering a penultimate and a last stops before arriving at the target, we consider a first and a second stops after departing from the source.

4.3.5 Source and Target Revealed at Query Time

When both the source and the target of a query are unknown beforehand, we select and combine the methods of previous sections. In one embodiment, we determine walks from the location of the source s to
STOPSTATION_CLUSTER_SOURCE_c,
for each c, and then travel from
STOPSTATION_CLUSTER_SOURCE_c
to target t (involving penultimate choices, or not). We respond with a minimum sum, selected across c. In one embodiment, we use a shortest walk with duration that is at most a threshold, or other embodiments as in Section 4.2.3.

4.4 Variants

Many modifications and variations will be apparent to those of ordinary skill in the art without departing from the scope and spirit of the embodiments. We present of few variants for illustration.

In one embodiment, we use a more general notion of a prospect edge. When travel involves multiple vehicles and waits, a shortest path search in a graph may traverse multiple prospect edges, and these prospect edges along the path will together abstract a sequence of more than one wait and ride. To capture this multiplicity, in one embodiment, we use a more general notion of a depth-d prospect edge that abstracts a sequence of at most d waits&rides. For example, a path c—walk1—wait1—bus1—walk2—wait2—bus2—walk3—c' could be abstracted as a depth-2 prospect edge from c to c'. In one embodiment, we add depth-d prospect edges for d larger than 1 to our graphs.

In one embodiment, our method constructs routes given a departure time. For example, consider the case when the rider wishes to begin travel at 8 AM on a Tuesday. Here, a routing query specifies a departure time, in addition to the source and target locations of travel. In one embodiment, the source is a
STOPSTATION_CLUSTER_SOURCE_s,
and the target is a
STOPSTATION_CLUSTER_TARGET_t.
We modify the graph G0, see FIG. 1. Because here even the first ride may involve waiting, we remove the FirstWait-GetOn edges and the
SUBWAY_FROM_s
vertices, but add edges from each
STOPSTATION_CLUSTER_SOURCE_c
to
BUS_STOP_b
and
SUBWAY_STATION_s,
for any b and s in the cluster c. In one embodiment, we adopt the Dijkstra's shortest paths algorithm to use prospect edges: For each vertex
PROSPECT_CLUSTER_SOURCE_c,
we maintain a lowest known expected arrival time of the rider at the vertex, and use this time to condition the wait, walk and ride duration random variables to compute prospect edges to each
PROSPECT_CLUSTER_TARGET_c'.
Using thus computed edge weights, we update the lowest known expected arrival times at
PROSPECT_CLUSTER_SOURCE_c'.
In other embodiment, instead of maintaining or updating a lowest known expected arrival time at each
PROSPECT_CLUSTER_SOURCE_c
or at each
PROSPECT_CLUSTER_TARGET_c,
we maintain or update a probability distribution of arrival time. In other embodiment, we adopt other shortest paths algorithms, for example the A* (A star) search algorithm in a similar fashion. In other embodiment, for example when a departure time is "now/soon", the conditional random variables are computed using the state of the transportation system at the time of the query, to provide more accurate distributions of wait and ride durations.

In one embodiment, our method constructs routes given an arrival deadline. For example, consider the case when the rider wishes to arrive at the target before 9 AM on a Tuesday. This is equivalent to departure from the target at 9 AM, but going back in time and space. This can be simply abstracted through an appropriately reversed construction of any of our graphs (buses and subways travel in reverse time and space).

In one embodiment, we determine prospect travel that meets a desired probability p of arrival before a deadline. When considering a prospect edge from c to c', we use a random variable A denoting an arrival time of the rider at c. Then, given the k random variables $T_1, \ldots, T_k$ of travel duration from c to c' using choices, we determine a distribution of arrival time at c' using the prospect travel, min $(A+T_1, \ldots, A+T_k)$. Then we determine up to which time t this distribution has the mass that is the desired probability p.

In one embodiment, we report the vehicles along a shortest path, or times of arrival/departure for each point along the path. This information can be simply read off the path in the graph and the choices of prospect edges along the path.

In one embodiment, we answer routing queries on computing devices with limited storage and restricted communication with a backend server. For example, this can happen on a mobile phone for a user concerned about privacy. In that case, we use an appropriately small number of clusters in graph G0. Similar techniques can be used in our other graphs.

In one embodiment, we impose requirements on a routing answer, including a maximum walk duration, a maximum number of transfers, a maximum wait duration, a restriction to specific types of vehicles (e.g., use only express bus and subway). Our invention realizes these requirements by an appropriate modification of graphs and a shortest paths algorithm on the graphs.

In one embodiment, our method is applied to an imperfect graph. For example, the weight of an edge WaitGetOn could inexactly reflect an expected wait duration for a subway, perhaps because we estimated the duration incorrectly, or there could be vertices and edges for a bus that does not exist in the metropolitan area, perhaps because the bus route was just cancelled by the city government while our method was not yet able to notice the cancellation, or we sampled the expectation of the minimum of choices with a large error, or used an approximate mathematical formula/algorithm. These are just a few non-exhaustive examples of imperfectness. In any case, our method can still be applied. It will simply produce routes with some error.

In one embodiment, we remove unnecessary vertices and edges from a graph. For example, we collapse "pass through" vertices
SUBWAY_AVG_FROM_TO_s'_s"
in G0 by fusing the incoming edge and the outgoing edge.

In one embodiment, the steps of our method are applied in other order. For example, when constructing graph G0, we can reverse the order described in Sections 4.2.1 and 4.2.2: first add vertices and edges of the non-fixed timetable vehicles, and then add vertices and edges of fixed timetable vehicles.

In one embodiment, we parallelize the method. For example, instead of computing the prospect edges from each
PROSPECT_CLUSTER_SOURCE_c
in turn, we can consider any two $c_1$ and $c_2$, and compute the prospect edges from
PROSPECT_CLUSTER_SOURCE_$c_1$
in parallel with computing the prospect edges from
PROSPECT_CLUSTER_SOURCE_$c_2$.

5 Computer System

One of the embodiments of the invention is a computer system that answers routing queries.

Figure 13:
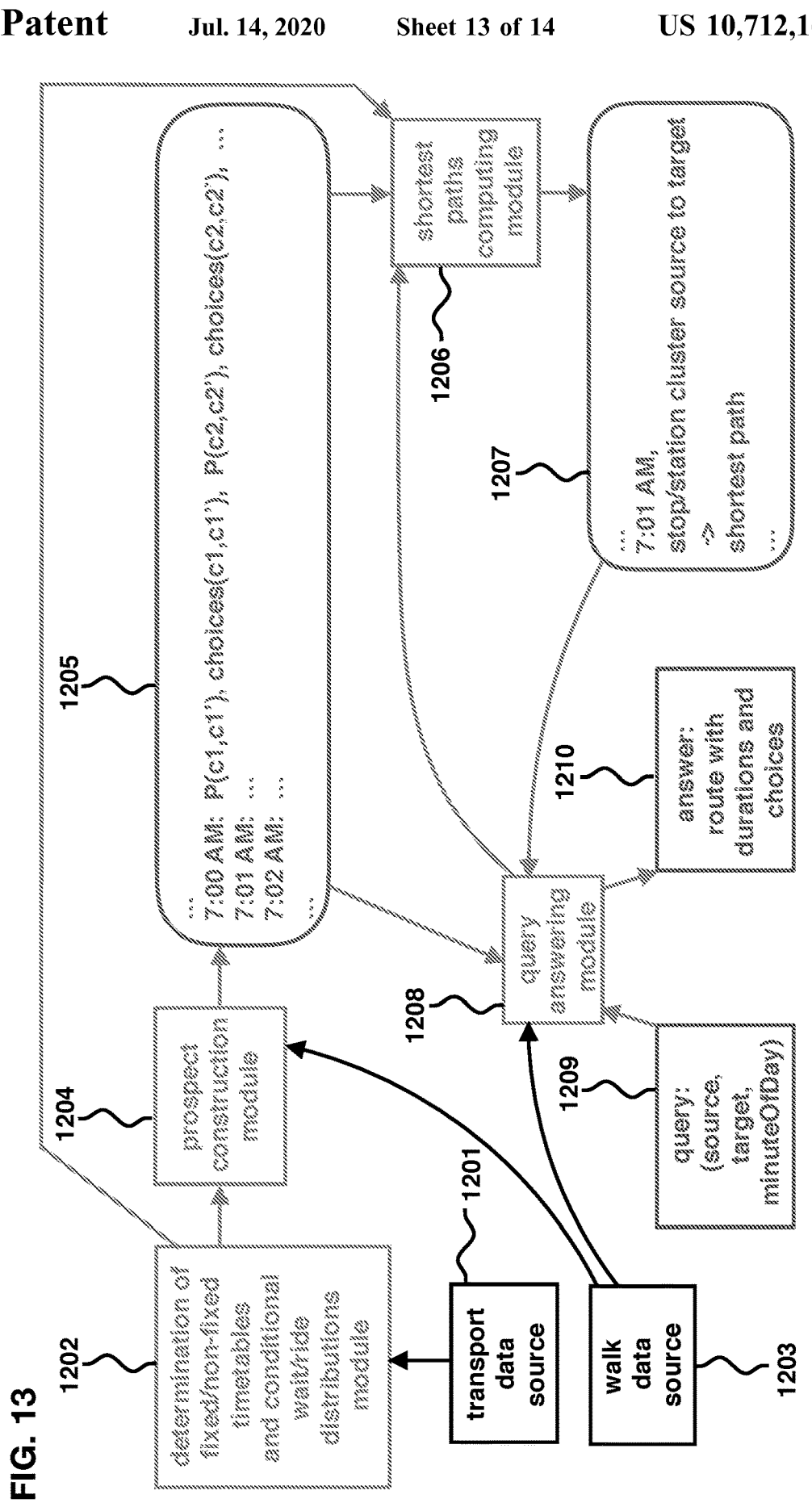
FIG. 13: depicts a process flow of a computer system for answering routing queries according to an embodiment of the invention.

In one embodiment, the system answers queries for a shortest route between locations, given a departure time: any query is in the form (source, target, minuteOfDay). An answer is in the form of a route with durations and choices. An illustration of the embodiment is in FIG. 13.

We use the term "module" in our description. It is known in the art that the term means a computer (sub)system that provides some specific functionality. Our choice of partitioning the computer system into the specific modules is exemplary, not mandatory. Those of ordinary skill in the art will notice that the system can be organized into modules in other manner without departing from the scope of the invention.

One module of the system (1202) reads information about the metropolitan transportation system from a plurality of data sources (1201). The module determines which vehicles, routes, or their parts, are consider fixed timetable, and which non-fixed timetable. The module computes routes for fixed timetable vehicles. The module also computes distributions of wait and ride durations conditioned on time for non-fixed timetable vehicles.

The output is passed to a module (1204) that computes prospect edges. That module queries information about walks from a plurality of data sources (1203). For selected prospect clusters c and c' and arrival times of the rider at c, the module computes the weight P(c, c') of the prospect edge and the choices, using random variables conditioned on the rider arrival time at c. The results are stored in storage (1205).

The modules (1202) and (1204) operate continuously. As a result, the system maintains a fresh model of the transportation system.

In the meantime, other module (1206) pre-computes shortest paths. The module constructs graphs that link locations at times by reading prospect edges from (1205) and non-prospect edges from (1202). Shortest paths algorithms are applied to the graphs to compute paths for selected queries in the form (stop/station cluster source, stop/station cluster target, minuteOfDay). The results are stored, so that a result can be looked up from storage (1207) when needed later.

Concurrently, the query answering module (1208) answers queries. When a query (source, target, minuteOfDay) arrives (1209), the module computes a shortest path following Section 4. The module contacts (1203) to determine walks between the source and the target, and the stop/station clusters. The module looks up relevant pre-computed shortest paths from (1207). When one is needed but not available yet, the module requests a shortest path from module (1206), and may store the resulting shortest path in storage (1207) for future use. The module (1208) also looks up choices and times from (1205). These walks, shortest paths and choices are combined to generate an answer to the query (1210).

Aspects of the invention may take form of a hardware embodiment, a software embodiment, or a combination of the two. Steps of the invention, including blocks of any flowchart, may be executed out of order, partially concurrently or served from a cache, depending on functionality and optimization. Aspects may take form of a sequential system, or parallel/distributed system, where each component embodies some aspect, possibly redundantly with other components, and components may communicate, for example using a network of any kind. A computer program carrying out operations for aspects of the invention may be written in any programming language, including C++, Java or JavaScript. Any program may execute on an arbitrary hardware platform, including a Central Processing Unit (CPU), and a Graphics Processing Unit (GPU), and associated memory and storage devices. A program may execute aspects of the invention on one or more software platforms, including, but not limited to: a smartphone running Android or iOS operating systems, or a web browser, including Firefox, Chrome, Internet Explorer, or Safari.

6 Computer Service Product

One of the embodiments of the invention is a service product available to users through a user-facing device, such as a smartphone application or a webpage. It will be obvious to anyone of ordinary skill in the art that the invention is not limited to these devices. It will also be obvious that the presentation of the service in our drawings can be modified (including rearranging, resiting, changing colors, shape, adding or removing components) without departing from the scope of the invention.

Figure 14:
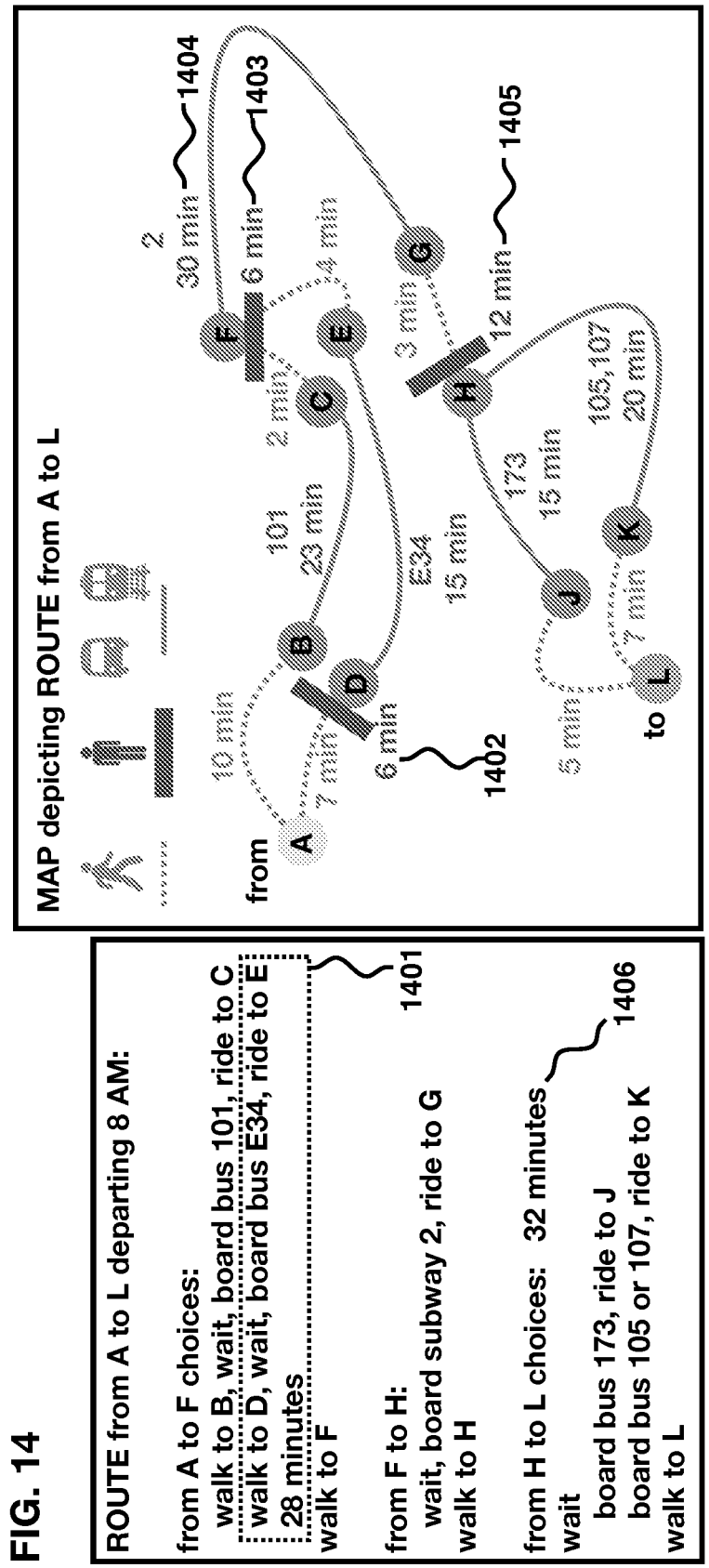
FIG. 14: depicts an example of a rendering of a route in response to a query by a service product on a smartphone of a user according to an embodiment of the invention.

In one embodiment, the service is accessed though a smartphone application. A user specifies a departure time, and a source and a target, by interacting with the User Interface of the application on the smartphone. The service then generates a route, and renders a representation of the route on the smartphone. FIG. 14 illustrates an example result for a query from A to L departing at 8 AM.

In one embodiment, the service reports which choice yields a shortest travel duration currently. In one embodiment, the system highlights this faster choice (illustrated by 1401 on the route), or shows the travel duration by the choice, or depicts a current wait duration (illustrated by 1402 near D). In one embodiment, this faster choice is computed given the current positions of the vehicles. In one embodiment, this report is rendered when the user is currently near the location of the choice; for example, when the user is about to depart from A, the service may render that in the current conditions, it is faster to get to F via D and E, rather than via B and C.

In one embodiment, the service depicts a current wait duration for each choice from among the choices at a location (illustrated by 1403 near F), or an expected ride duration for each choice (illustrated by 1404). This may help the user decide by themselves which choice to take, even if not optimal.

In one embodiment, the service reports one expected wait duration for all the choices at a location. The duration is an expected wait duration assuming the user will board the choice that achieves an expected minimum travel duration (illustrated by 1405 near H). In one embodiment, this report is rendered when vehicle positions are uncertain, for example for a segment of the route far down the road compared to the current position of the user. This informs the user how long they will idle at a stop/station waiting for a vehicle.

In one embodiment, the service reports a duration of prospect travel between two locations (illustrated by 1406 on the route). This is the value denoted P(c, c') in Section 4.

In one embodiment, the service responds to the user with at least one of:
1. the source location rendered on a map;
2. the target location rendered on a map;
3. a location of any stop along a route rendered on a map;
4. a sequence of locations along a route rendered on a map;
5. a name, an address, or an identifier of any of: the source location, the target location, or any stop along a route;
6. a departure time;
7. a departure time range;
8. an arrival time;
9. an arrival time range;
10. a probability of arriving before a deadline;
11. a sequence of locations along two or more choices that travel between two locations rendered on a map;
12. directions for a walk component in any choice;
13. a location or a duration of a wait component in any choice;
14. directions for a ride component in any choice;
15. an expected minimum wait duration among at least two choices;
16. a current minimum wait duration among at least two choices;
17. an expected travel duration for any component of a choice, or a choice; or an expected minimum travel duration among at least two choices;
18. a current travel duration for any component in a choice, or a choice; or a minimum travel duration among at least two choices;
19. an expected departure time or an expected arrival time for: any component in a choice, a choice, or a minimum among at least two choices;
20. a current departure time or a current arrival time for: any component in a choice, a choice, or a minimum among at least two choices;
21. a name or an identifier of any vehicle in any choice;
22. a name, an address, or an identifier of any stop of any vehicle in any choice;
23. a current location of any vehicle in any choice; or
24. a rendering of which choice, from among two or more choices, is fastest given current locations of vehicles.

7 Claims

Those skilled in the art shall notice that various modifications may be made, and substitutions may be made with essentially equivalents, without departing from the scope of the present invention. Besides, a specific situation may be adapted to the teachings of the invention without departing from its scope. Therefore, despite the fact that the invention has been described with reference to the disclosed embodiments, the invention shall not be restricted to these embodiments. Rather, the invention will include all embodiments that fall within the scope of the appended claims.

The invention claimed is:

1. A method for providing a route or a route duration for a journey from a source location to a target location, the method comprising:
    (a) receiving a request comprising the source location and the target location;
    (b) generating the route or the route duration; and
    (c) responding to the request with information comprising a representation of the route or the route duration;
    the method characterized by the generating comprising:
    (d) determining two or more travel durations, wherein each travel duration:
        i. is a mathematical random variable that is non-trivial, and
        ii. describes a duration of travel from the source location to the target location; and
    (e) using a mathematical random variable M that is a minimum of the two or more travel durations.

2. A method for providing a route or a route duration for a journey from a source location to a target location, the method comprising:
    (a) receiving a request comprising the source location and the target location;
    (b) generating the route or the route duration; and
    (c) responding to the request with information comprising a representation of the route or the route duration;
    the method characterized by the generating comprising:
    (d) determining a graph path between a graph vertex within a first threshold distance from the source location and a graph vertex within a second threshold distance from the target location,
        wherein the graph path is included in a graph comprising:
        i. a plurality of graph vertices including at least two graph vertices that represent vehicle stops, and
        ii. a plurality of graph edges including at least two graph edges that represent vehicle travel durations;
        wherein the graph path includes a graph prospect edge that:
        iii. is included in the plurality of graph edges, and
        iv. leads from a prospect edge origin vertex to a prospect edge destination vertex, both included in the plurality of graph vertices;
    (e) determining two or more travel durations, wherein each travel duration:
        i. is a mathematical random variable that is non-trivial, and
        ii. describes a duration of travel from a location of the prospect edge origin vertex to a location of the prospect edge destination vertex; and
    (f) using a mathematical random variable M that is a minimum of the two or more travel durations.

3. A computer system for providing a route or a route duration for a journey from a source location to a target location, the computer system comprising:
    (a) one or more processors;
    (b) a computer-readable storage medium storing one or more programs for execution by the one or more processors; and
    (c) the one or more programs comprising instructions to be executed by the one or more processors so as to perform at least one step;
    wherein the at least one step comprises:
    (d) receiving a request comprising the source location and the target location;

(e) generating the route or the route duration; and
(f) responding to the request with information comprising a representation of the route or the route duration;
the computer system characterized by the generating comprising:
(g) determining two or more travel durations, wherein each travel duration:
  i. is a mathematical random variable that is non-trivial, and
  ii. describes a duration of travel from the source location to the target location; and
(h) using a mathematical random variable M that is a minimum of the two or more travel durations.

4. An apparatus for providing a route or a route duration for a journey from a source location to a target location, the apparatus comprising one or more modules configured to perform at least one step, wherein the at least one step comprises:
(a) receiving a request comprising the source location and the target location;
(b) generating the route or the route duration; and
(c) responding to the request with information comprising a representation of the route or the route duration;
the apparatus further comprising:
(d) a receiver configured to receive from a user the request; and
(e) a transmitter configured to respond to the user with the information;
the apparatus characterized by the generating comprising:
(f) determining two or more travel durations, wherein each travel duration:
  i. is a mathematical random variable that is non-trivial, and
  ii. describes a duration of travel from the source location to the target location; and
(g) using a mathematical random variable M that is a minimum of the two or more travel durations.

* * * * *